(12) United States Patent
Clark

(10) Patent No.: US 6,560,326 B1
(45) Date of Patent: May 6, 2003

(54) SERVICE BROKERING SYSTEM FOR INTELLIGENT TELECOMMUNICATIONS NETWORK

(75) Inventor: Anthony Clark, Lombard, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/295,570

(22) Filed: Apr. 21, 1999

(51) Int. Cl.[7] .............................................. H04M 7/00
(52) U.S. Cl. .............................. 379/221.09; 379/221.08
(58) Field of Search ...................... 379/221.08, 221.09, 379/207.2

(56) References Cited

U.S. PATENT DOCUMENTS

| | | | | |
|---|---|---|---|---|
| 5,933,490 A | * | 8/1999 | White et al. | 379/221.01 |
| 5,963,630 A | * | 10/1999 | Dabbs et al. | 379/201.01 |
| 5,966,434 A | * | 10/1999 | Schafer et al. | 379/201.01 |
| 6,389,130 B1 | * | 5/2002 | Shenoda et al. | 370/352 |

* cited by examiner

Primary Examiner—Ahmad F. Matar
Assistant Examiner—Quynh Nguyen
(74) Attorney, Agent, or Firm—Walter W. Duft

(57) ABSTRACT

An intelligent telecommunications network includes a plurality of switching nodes and service control points containing one or more service programs (SPs) responsive to connection query messages from the switching nodes. Each SP provides connection control messages that allow the switching nodes to make connections that implement a selected intelligent network service. A service brokering system is incorporated in the network for managing the SPs to provide individual intelligent network services, or combinations thereof, to network users in association with individual call trigger events. The service brokering system includes a service combination manager service control point (SCM_SCP) containing a service combination manager (SCM) that acts as a gateway for incoming connection query messages from the switching nodes. The SCM preferably, but not necessarily, includes at least one feature combination manager (FCM) configured to manage the invocation of at least two of the SPs and, as necessary, to format the connection control messages generated thereby into appropriate multi-service connection control messages for use by the switching nodes. The SCM returns the multi-service connection control messages to the switching nodes, and the switching nodes make appropriate connections based on the combination of intelligent network services associated with the SPs managed by the FCM.

21 Claims, 4 Drawing Sheets

SERVICE BROKERING SYSTEM FOR INTELLIGENT TELECOMMUNICATIONS NETWORK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to intelligent telecommunications networks. More particularly, the invention concerns the management of intelligent network services implemented on behalf of subscribers via service programs operating within a network.

2. Description of the Prior Art

An intelligent telecommunications network makes call connections between originating and terminating users based on instructions issued by service programs in response to connection queries from switching nodes within the network. The service programs provide connection control information that allows the switching nodes to make appropriate connections that implement the intelligent network services requested by the users. Such services include call waiting, call forwarding, and voice messaging, to name but a few.

To illustrate, assume a network user is a call forwarding service subscriber and that the call forwarding feature has been activated. When a terminating call attempt reaches the network switching node responsible for setting up connections to the user, the switching node issues a query to an appropriate service program. The service program consults a user-specific database and instructs the switching node to direct the incoming call to the forwarding number(s) selected by the user.

With several exceptions, intelligent telecommunications network service providers presently offer only a single intelligent network service per call trigger per subscriber. A subscriber can subscribe to one intelligent network service applicable to terminating triggers (e.g., call forwarding), one intelligent network service applicable to originating triggers (e.g., 900 number screening), and one intelligent network service applicable to any given mid-call trigger (if available). Typically, these intelligent network services are provided by separate service programs operating on separate intelligent network hardware platforms known as service control points (SCPs).

Improved network functionality could be achieved if subscribers were provided the option of invoking more than one of the available intelligent network services per call trigger. For example, a user might wish to implement both voice messaging and call forwarding for a given terminating trigger event, and give callers the choice of leaving voice messages or forwarding their calls to another number. This combination of services would be difficult to provide in a conventional intelligent telecommunications network that uses stand-alone service programs to provide voice messaging and call forwarding services individually. In all likelihood, the services would not function together in the manner expected by the user. Incoming calls would either be recorded and never forwarded, or forwarded and never recorded.

As the foregoing example illustrates, intelligent network services sometimes need to behave differently when interacting with each other than they behave when operating alone. As such, before subscribers can be offered more than one intelligent network service per call trigger, a mechanism is needed to coordinate the various services.

As far as known, there are a small number of intelligent telecommunications networks that offer multiple intelligent network services per call trigger per subscriber, but these networks do not utilize individual service programs. Instead, they take an integrated approach to service provision by combining multiple intelligent network services in an integrated service program package that resides on a single SCP.

Although such integrated service programs are able to provide multi-service functionality, there are several drawbacks to this approach. First, because an integrated service program package is large, the software is relatively difficult to develop, manage and maintain. Second, it is rather cumbersome to upgrade individual services because the entire package must be modified. Finally, it is not possible to incorporate individual service programs (available on the same or different SCPs) into an existing integrated service program package so as to expand the available services. New services can only be added by embellishing the existing integrated service package with new code.

Accordingly, there is a need in an intelligent telecommunications network for a system that allows intelligent network services to be efficiently combined so that more than one intelligent network service can be offered per call trigger per subscriber. This goal should preferably be achieved without having to rewrite the installed network services code base, such that existing service control software may continue to be used. What is required is a system for integrating currently implemented intelligent network service programs so that the intelligent network services they render may be offered to network subscribers in selectable combinations relative to any single call trigger event.

SUMMARY OF THE INVENTION

A highly configurable service brokering system for use in an intelligent telecommunications network provides a novel solution to the foregoing problem. The intelligent telecommunications network includes a plurality of switching nodes and one or more service control points containing at least two intelligent network service programs (SPs) responsive to connection query messages from the switching nodes. Each SP provides connection control messages that allow the switching nodes to make connections that implement a selected intelligent network service. The service brokering system of the present invention provides an efficient mechanism for managing the SPs to provide combinations of intelligent network services to network users in association with individual call trigger events.

In preferred embodiments of the invention, the service brokering system includes a service combination manager (SCM) that acts as a gateway for incoming connection query messages from the switching nodes. The SCM is configured to manage the invocation of one or more SPs and, as necessary, to format the connection control messages generated thereby into appropriate connection control messages for use by the switching nodes. The SCM returns its connection control messages to the switching nodes, and the switching nodes make connections based on the intelligent network service(s) associated with the SP(s) invoked by the SCM.

In a most preferred embodiment, the invention is implemented in an intelligent telecommunications network that includes a plurality of service switching points (SSPs), each of which acts as a representative for one or more network users, a plurality of service transfer points (STPs), each of which acts as a message routing agent for one or more of the SSPs, and a plurality of service control points (SCPs), each of which acts as a call setup resource on behalf of the one or more of the SSPs. A plurality of interconnections are provided for exchanging messages between the SSPs, the STPs and the SCPs. Each SCP contains at least one intelligent network service program (SP) for providing user-specific connection information to the SSPs based on an intelligent network service subscribed to by one or more network users.

In accordance with the aforesaid most preferred embodiment of the invention, a service combination manager SCP (SCM_SCP) is introduced into the intelligent telecommunications network, either as a new SCP hardware platform, or as an enhancement to an existing SCP. The SCM_SCP is connected to one or more of the STPs and the STPs are programmed to route connection query traffic from the SSPs to the SCM_SCP. The SCM_SCP contains a service combination manager (SCM) that acts as a gateway for receiving the incoming connection query messages generated by the SSPS. Preferably, but not necessarily, a plurality of feature combination managers (FCMs) are provided within the SCM, each of which manages at least two of the SPs by selectively invoking the SPs and, as necessary, formatting the connection control messages generated thereby into multi-service connection control messages. Upon the completion of SP processing, the SCM returns the multi-service control messages to the requesting SSP, and the SSP uses the returned information to make appropriate connections based on the combination of intelligent network services associated with the SPs managed by the FCMs.

BRIEF DESCRIPTION OF THE DRAWING

The foregoing and other features and advantages of the invention will be apparent from the following more particular description of a preferred embodiment of the invention, as illustrated in the accompanying Drawing, in which.

DETAILED DESCRIPTION OF THE PREFERRED EMBODIMENT

Figure 1:
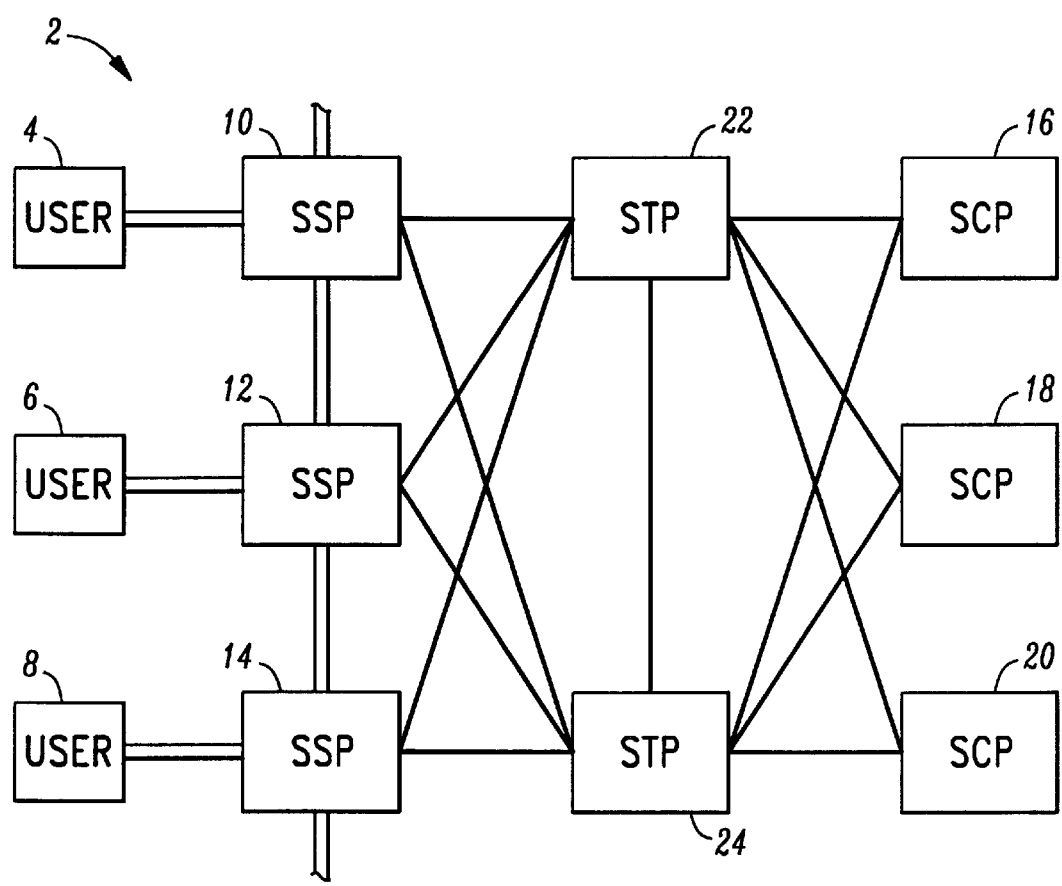
FIG. 1 is a block diagram showing relevant portions of an exemplary intelligent telecommunications network.

Turning now to the figures, wherein like reference numerals represent like elements in all of the several views, FIG. 1 illustrates an exemplary intelligent telecommunications network 2. The network 2 provides telecommunications between a plurality of network users, three of which are shown by reference numerals 4, 6 and 8. The users 4, 6 and 8 could be telephones, fax machines or modems. They could also be shared systems such as private branch exchanges or key telephone systems.

Each user 4, 6 and 8 connects to the network 2 at a switching node that is commonly referred to as a Service Switching Point (SSP). Three SSPs 10, 12 and 14 are shown in FIG. 1. They act as the network representatives of the users 4, 6 and 8, respectively. Typically, the SSPs are located at an End Office (EO) or Central Office (CO) that provides local telephone services within a limited geographic area, such as a community or section of a community. The SSPs are intelligent network switches (e.g. 5ESS™ switches) that are controlled to make connections to other SSPs or to trunk switches (not shown) in order to transfer data across the network 2. The data transmission pathways in the network 2 are illustrated in FIG. 1 using double lines.

The remainder of the node elements shown in FIG. 1 are part of a signaling system portion of the network 2. Signaling is the method by which the SSPs exchange call set up information in order to establish the connections between network users. As described in more detail below, these connections are based on intelligent network services that are subscribed to by the users.

The prevailing signaling standard used today is known as Signaling System 7 (SS7). According to this standard, incoming and outgoing call connections are negotiated by the SSPs using call setup instructions retrieved from network service control points (SCPs). The SSPs exchange call connection messages with the SCPs, and negotiate connections with other SSPs, using intermediate message routing switches known as signaling transfer points (STPs). FIG. 1 illustrates three SCPs 16, 18 and 20, and two STPs 22 and 24. They are interconnected by message exchange links that are illustrated in FIG. 1 using single lines.

The SCPs are programmed computer databases that act as agents for the SSPs. Each SCP database contains user specific connection information corresponding to some number of network users. The SCPs process connection query messages from the SSPs and return connection control messages that instruct the SSPs to negotiate appropriate call connections with other SSPs. The STPs are packet switches that route the connection request and connection control messages between the SSPs and the SCPs, as well as the messages exchanged between the SSPs during call set up negotiations. Although not shown, the STPs and the SCPs are implemented in pairs to provide redundancy in the event of an SS7 link or node failure, and to share message traffic loads when necessary. Also not shown is the commonly implemented use of plural message links, known as link sets, between the STPs and the SCPs.

The signaling system portion of the network 2 works as follows: When a user (the originating user) dials another user (the terminating user), the SSP representing the originating user (the originating SSP) issues a connection query message to an SCP acting as the originating SSP's agent (the originating SCP). The originating SCP processes the connection query message and returns a connection control message to the originating SSP that contains instructions for contacting and negotiating a connection with the terminating user's SSP (the terminating SSP). When the terminating SSP receives the initial call message (IAM) from the originating SSP, it submits a connection request query to its SCP (the terminating SCP; which could be the same as the originating SCP). The terminating SCP returns a connection control message to the terminating SSP that contains instructions for responding to and negotiating a connection with the originating SSP. The two SSPs use their respective instructions to engage in a dialog with each other to set up the call.

Figure 2:
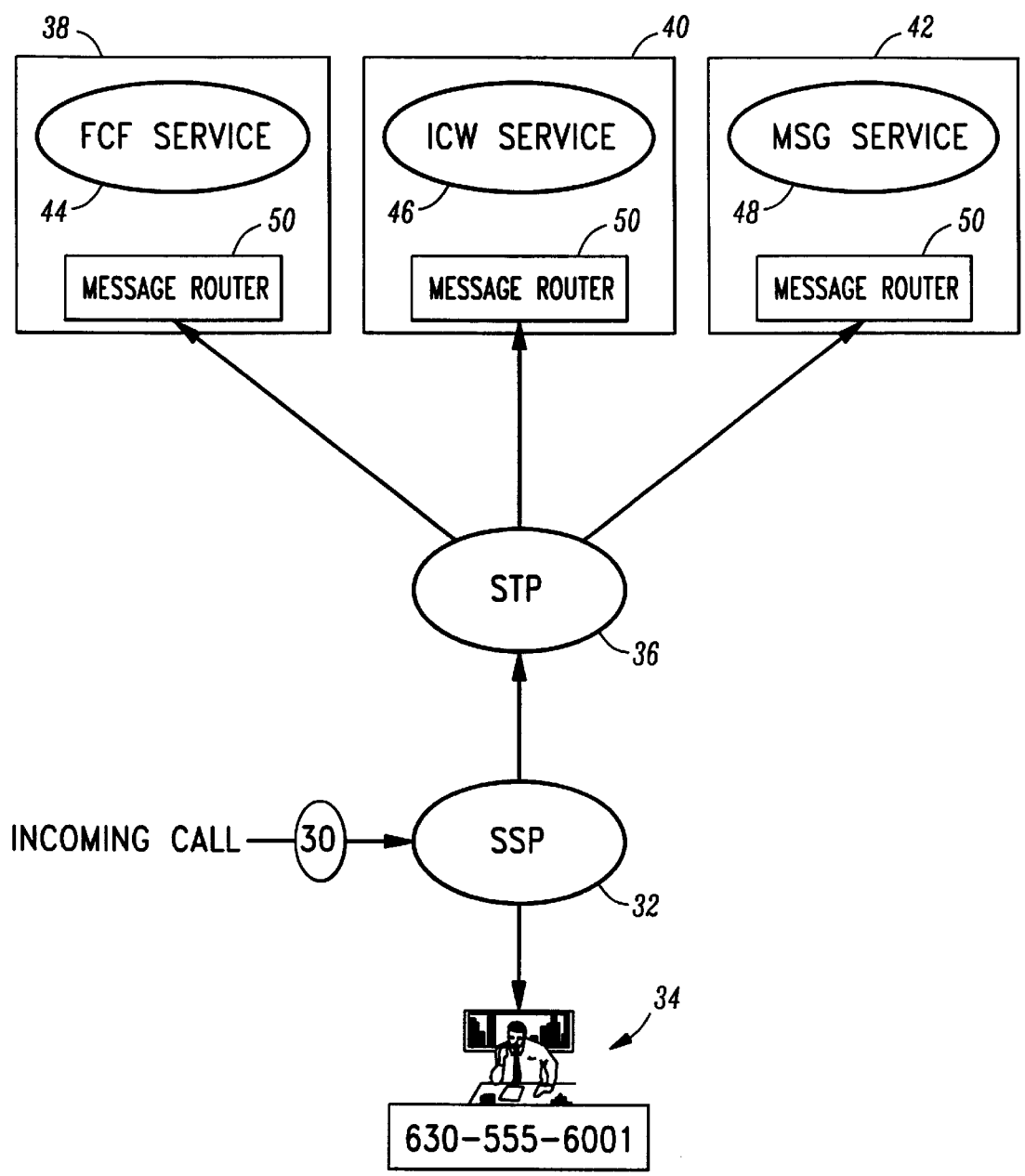
FIG. 2 is a block diagram showing a conventional network implementation for processing connection query messages.

Turning now to FIG. 2, the processing of an incoming initial call message 30 to a terminating SSP 32 is shown in a conventional intelligent telecommunications network. The terminating SSP 32 is the network representative for a network user 34, which is assumed to be a telephone that has been assigned an active telephone number, e.g., "630-555-6001." The SSP 32 receives the initial call message 30 and generates a connection query message requesting instructions for setting up the incoming call with the originating SSP (not shown). This connection query message is conventionally known as a Terminating Attempt Trigger (TAT).

In the example of FIG. 2, the user is assumed to subscribe to one of three available terminating services (there would typically be more) offered by the network service provider. The exemplary services shown in FIG. 2 are Flexible Call Forwarding (FCF), Internet Call Waiting (ICW) and Messaging (MSG). FCF allows a user to specify any of several forwarding telephone numbers where incoming calls can be forwarded if the user is not at the main number. ICW allows a user to receive calls while logged onto the public Internet via a modem connected to the user's telephone line. MSG provides voice mail services.

In FIG. 2, the connection query message generated by the SSP 32 is forwarded to an STP 36. The STP 36 routes the connection query message to an appropriate SCP (or SCP pair). There are three SCPs shown in FIG. 2; namely, an SCP 38, an SCP 40 and an SCP 42. Each SCP 38, 40 and 42 runs a database under the control of a service program (SP) that provides one of the aforementioned services. More specifically, each SP is a software program that controls a database containing user-specific call connection information. The SPs process the incoming connection query messages and generate service-specific (i.e., one service per SP) connection control messages containing call connection instructions for the SSPs.

As shown in FIG. 2, the SCP 38 runs an FCF_SP 44, the SCP 40 runs an ICW_SP 46, and the SCP 42 runs an MSG_SP 48. Although not shown, an alternative configuration would be to provide a single SCP running two, or even all three, of the SPs 44, 46 or 48, albeit as stand-alone programs. As is conventional, each SCP includes the usual message routing interface 50 that allows it to transmit and receive SS7 signaling messages.

As previously described, the selection of which SP receives the connection query message depends upon which terminating service, FCF, ICW or MSG, the user 34 has selected. If the user 34 is an FCF subscriber, the connection query message is routed to the FCF_SP 44 in the SCP 38. If the user 34 is an ICW subscriber, the connection query message is routed to the ICW_SP 46 in the SCP 40. If the user 34 is a MSG subscriber, the connection query message is routed to the MSG_SP 48 in the SCP 42. With this arrangement, and given current limitations as to the manner in which existing SSPs and STPs generate and route connection query messages, there is no provision for offering combinations of such services to a single user.

Figure 3:
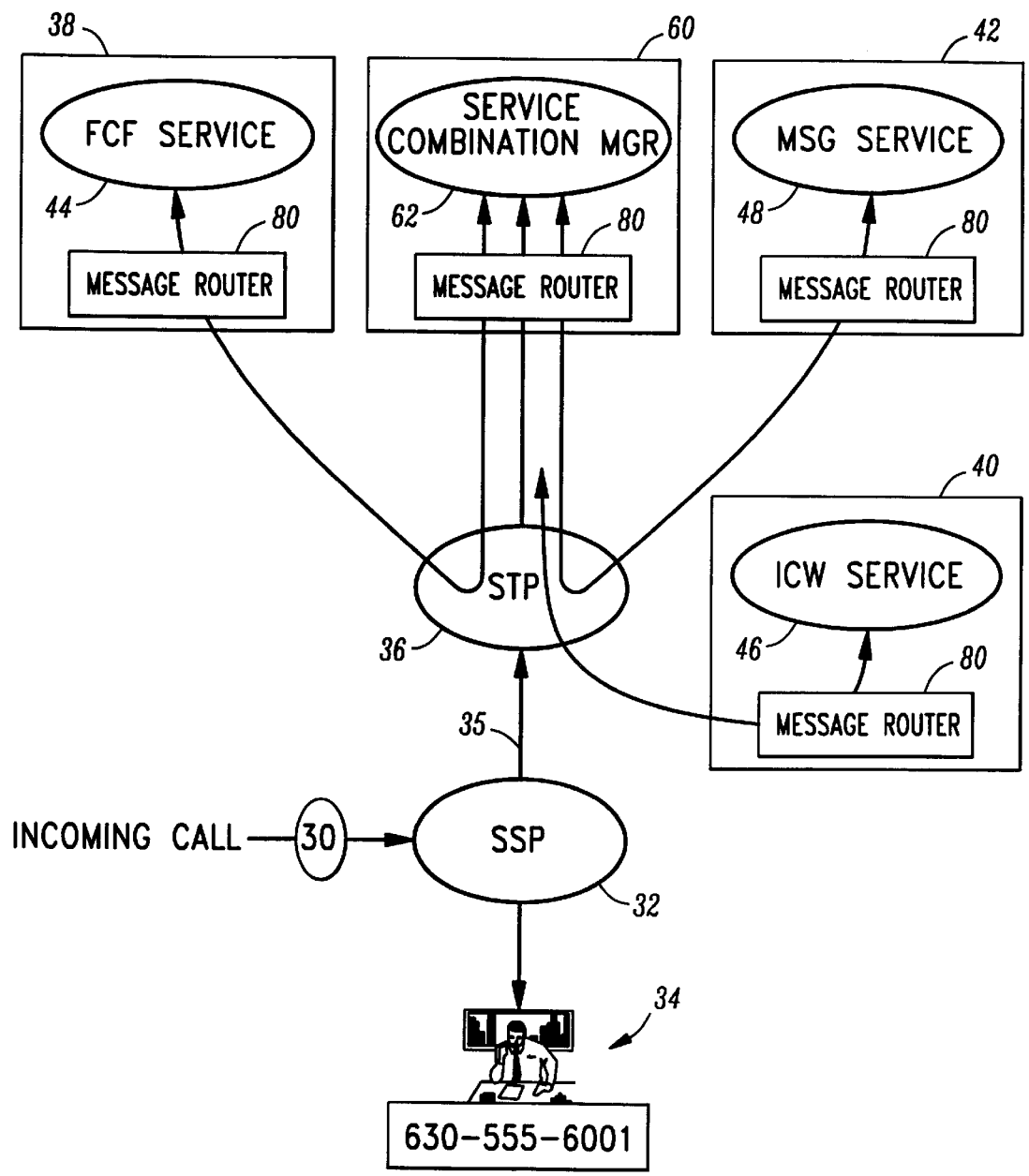
FIG. 3 is a block diagram showing an improved network implementation incorporating a service brokering system in accordance with the invention.

Turning now to FIG. 3, an improved intelligent telecommunications network is configured with a service brokering system in accordance the invention. For ease of description, it is assumed that the same incoming initial call message 30 referred to above is submitted by an originating user's SSP (not shown) to the SSP 32 owned by the user 34. The SSP 32 generates a connection query message (TAT) and forwards it to the STP 36. This time, instead of routing the connection query message to one of the SCPs 38, 40 or 42 for direct handling by one of the SPs 44, 48 and 46, the STP 36 forwards the connection query message to a service combination manager SCP (SCM_SCP) 60 that runs a service combination manager (SCM) 62.

The SCM 62 is a software application that acts as a gateway for incoming connection query messages generated by the SSP 32 (and other SSPs). Depending on the service(s) requested by the user 34 in FIG. 3, the SCM selectively invokes one or more of the individual SPs 44, 46 and 48 located at the SCPs 38, 40 and 42, and returns appropriate connection control messages that the SSP 32 uses to set up the call connections.

Figure 4:
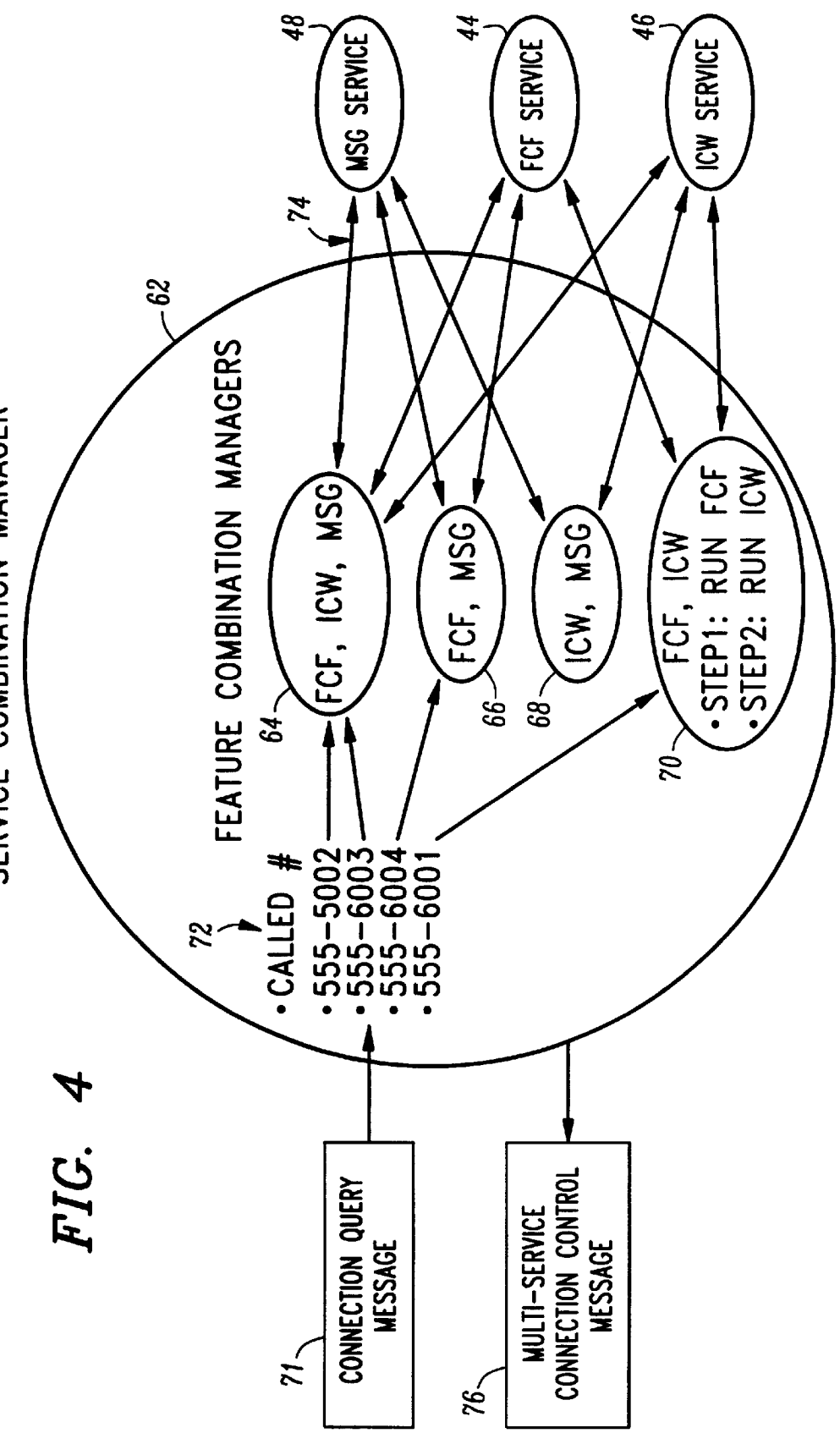
FIG. 4 is a block diagram showing details of the service brokering system illustrated in FIG. 3.

To manage combinations of the SPs 44, 46 and 48 on behalf of multi-service subscribers, the SCM 62 preferably, but not necessarily, implements plural feature combination managers (FCMs), as shown in FIG. 4. Each FCM is a software module dedicated to managing the invocation of at least two SPs in order to provide multi-service connection control messages in response to incoming connection query messages from the SSP 32 (and other SSPs). One FCM is preferably provided for each combination of services offered by the SPs. In the example of FIGS. 3 and 4, there are four FCMs, designated by reference numerals 64, 66, 68 and 70, that correspond to each possible combination of the services offered by the FCF_SP 44, the ICW_SP 46 and the MSG_SP 48.

It will be appreciated that the number of FCMs depends on the number of services being managed. The smallest possible number of FCMs in an SCM (assuming FCMs are used at all) would be one FCM managing two services. As shown in FIG. 4, four FCMs are required to manage all combinations of three services. Taking the analysis further, eleven FCMs are required to manage all combinations of four services, twenty-six FCMs are needed to manage all combinations of five services, and fifty-seven FCMs are necessary to manage all combinations of 6 services.

The operation of the SCM 62 and its FCMs 64, 66, 68 and 70 is as follows: An incoming connection query message 71 (e.g., a TAT) is received at the SCM_SCP 60 and provided to the SCM 62. The SCM 62 consults a database 72 that contains user telephone numbers and identifies the services associated with each telephone number. FIG. 4 illustrates four telephone numbers within the database 72, each of which is associated with some combination of services. For example, the telephone numbers "555-5002" and "555-6003" represent network users that have subscribed to each of the FCF, ICW and MSG services. The telephone number "555-6004" represents a user that has subscribed to the FCF and MSG services. Finally, the telephone number "555-6001", corresponds to the user 34 of FIG. 3, and this user is assumed to have subscribed to the FCF and ICW services. Based on the service combination determined from the database search, as well as any provisional information contained in the incoming connection query message, the SCM 62 forwards the query 71 to an appropriate one of the FCMs 64, 66, 68 or 70.

FIG. 4 illustrates an example where the SCM 62 determines from the database 72 that the user 32 having the telephone number "555-6001" is an FCF+ICW subscriber. The SCM 62 thus routes the incoming connection query message to the FCM 70. As shown in FIG. 4, the FCM 70 sequentially queries the FCF_SP 44 and the ICW_SP 46, either by forwarding the original connection query message generated by the SSP, or by sending an FCM-generated query message. The FCF_SP 44 and the ICW_SP 46 respond by sending connection control response messages back to the FCM 70. These query and response messages are collectively identified by reference numeral 74 in FIG. 4. As may be necessary, the FCM 70 formats the SP response messages to formulate an appropriate multi-service connection control message 76 that contains the instructions needed by the SSP 32 to implement the combination of intelligent network services subscribed to by the user 34. For example, the SSP 32 might be instructed to first invoke FCF to forward the incoming call to a specified call forwarding number, and then invoke ICW to provide an alert, if the call forwarding line is in use by a modem, that an incoming call has arrived.

The foregoing example illustrates the operation of the FCM 70 receiving a connection query message that is provided to it by the SCM 62, and thereafter using the incoming message to selectively invoke plural SPs in serial fashion. In other cases, an FCM might selectively invoke plural SPs in parallel fashion. In still other cases, an FCM might selectively invoke plural SPs in alternating fashion. The operations of the FCMs are thus fully programmable to accommodate all of the necessary service interactions required by the user.

Returning now to FIG. 3, it will be seen that the gateway SCP 60, along with the SCPs 38, 40 and 42, each include a conventional message router 80 that facilitates two-way communications between the SCM_SCP 60 and the SCPs 38, 40 and 42 according to SS7 signaling standards.

By way of elaboration, in the incoming call example of FIGS. 3 and 4, the SSP 32 generates the usual connection query message containing a TAT identifier, a Translation Type (TT) code and the terminating telephone number. The STP 36 receives the connection query message and uses a look-up table to perform global title translation (GTT) on the telephone number contained within the message. The GTT procedure generates a destination point code (DPC) specifying that the query message should go to the gateway SCP 60, and a subsystem service number (SSN) that directs the message to the SCM 62 located within the SCM_SCP 60. The SSN is required because there could be other SPs operating within the SCM_SCP 60, as is the case with other SCPs. When one of the FCMs 64, 66, 68 or 70 generates (or forwards) connection query messages bound for individual SPs, the SCM_SCP 60 routes the FCM query messages through the STP 36, as shown in FIG. 3. This time, the STP 36 does not perform GTT in order to route the FCM query messages to the correct SCPs and SPs. In this case, the SCM_SCP 60 (e.g., the message router 80, the SCM 60 or the requesting FCM therein) inserts the DPC and SSN identifiers into the FCM query messages prior to sending them to the STP 36. Advantageously, because SCM_SCP 60 knows the DPCs and SSNs for the recipient SCPs and SPs that it manages, the SCM_SCP 60 does not need to use GTT to generate DPCs and SSNs for the FCM queries, which increases efficiency. As shown in FIG. 3, the SPs return their connection control response messages to the requesting FCM via the STP 36.

All connection query messages generated by the SSP 32 on behalf of multiple-service users are preferably directed to the SCM 62 resident at the SCM_SCP 60 (or to some other SCM therein). Connection query messages for single-service subscribers may likewise be routed to the SCM 62. Alternatively, in the case of single-service users, it would be possible to continue to direct connection query messages to selected ones of the individual SCPs 38, 40 and 42. Whether a user is a single-service or multiple-service subscriber could be determined from the user's telephone number, either by the STP 36 during GTT, or by the SSP 32 when it generates the connection query messages.

Accordingly, a service brokering system for use in an intelligent telecommunications system has been described. While various embodiments have been disclosed, it should be apparent that many variations and alternative embodiments could be implemented in accordance with the invention. For example, although FIG. 3 illustrates a topology wherein the SPs are resident at individual SCPs that are separate from the SCM_SCP 60, it will appreciated that one or more of the SPs could be resident within the SCM_SCP 60, or grouped together in any other SCP. It is normally expected that the SPs will reside on separate SCPs, however, insofar as an important advantage of the service brokering system of the present invention is that it can be easily incorporated into an existing intelligent telecommunications system having a topology such as that shown in FIG. 2. It is understood, therefore, that the invention is not to be in any way limited except in accordance with the spirit of the appended claims and their equivalents.

What is claimed is:

1. In an intelligent telecommunications network having a plurality of switching nodes, and service control points containing at least two service programs (SPs) responsive to connection query messages from the switching nodes, each SP providing connection control messages that allow the switching nodes to make connections that implement a selected intelligent network service, a service brokering system for managing the SPs to provide combinations of the selected network services, comprising:

a service combination manager (SCM) acting as a gateway for incoming connection query messages generated by said switching nodes, said SCM being configured with one or more feature combination managers (FCMs) to manage the invocation of at least two of said SPs and to return appropriate multi-service connection control messages to said requesting switching nodes, said multi-service connection control messages containing instructions for controlling said switching nodes to make appropriate connections based on the combination of intelligent network services associated with said at least two SPs, said SCM having one FCM for each combination of said SPs.

2. A service brokering system in accordance with claim 1 wherein said SCM is resident at a SCM service control point (SCM_SCP) that communicates with said switching nodes.

3. A service brokering system in accordance with claim 2 wherein said SPs are resident at service control points (SCPs) that are separate from said SCM_SCP.

4. A service brokering system in accordance with claim 3 wherein each of said SPs is resident at a separate SCP, each of which is separate from said SCM_SCP.

5. A service brokering system in accordance with claim 3 wherein said switching nodes connect to said SCPs as well as said SCM_SCP and said intelligent telecommunications network is configured to direct connection query messages on behalf of single-service subscribers to selected ones of said SCPs and to direct connection query messages on behalf of multiple-service subscribers to said SCM_SCP.

6. A service brokering system in accordance with claim 5 wherein said switching nodes include a service switching point (SSP) that is configured to generate connection query messages in response to user connection requests and to forward said connection query messages to a service transfer point (STP), said STP being configured to perform global title translation (GTT) on said connection query messages to generate a destination point code (DPC) that determines which of said SCPs should receive said connection query messages as a receiving SCP, and a subsystem service number (SSN) to determine which service should be rendered at said receiving SCP.

7. A service brokering system in accordance with claim 6 wherein said SCM_SCP is configured to generate DPC and SSNs to communicate with SCPs containing SPs managed by said FCMs, said SCM_SCP being further configured to generate said DPCs and said SSNs without performing GTT.

8. A service brokering system in accordance with claim 1 wherein said FCMs are configured to receive selected ones of said incoming connection query messages from said SCM, and wherein said FCMs uses said connection query messages to selectively invoke plural SPs in serial fashion.

9. A service brokering system in accordance with claim 1 wherein said FCMs are configured to receive selected ones of said incoming connection query messages by said SCM, and wherein said FCMs use said connection query messages to selectively invoke plural SPs in parallel.

10. A service brokering system in accordance with claim 1 wherein said FCMs are configured to receive selected ones of said incoming connection query messages by said SCM, and wherein said FCMs use said connection query messages to selectively invoke plural SPs in alternating fashion.

11. In an intelligent telecommunications network having a plurality of switching nodes, and service control points containing at least two service programs (SPs) responsive to connection query messages from the switching nodes, each SP providing connection control messages that allow the switching nodes to make connections that implement a selected network service, a service brokering method for managing the SPs to provide combinations of the selected intelligent network services, comprising:

receiving connection query messages from said switching nodes;

managing the invocation of at least two of said SPs based on services that are identifiable from said connection query messages using feature combination managers (FCMs) assigned to each combination of said SPs;

formatting the connection control messages generated by said at least two SPs into appropriate multi-service connection control messages for use by said switching nodes; and returning said multi-service connection control messages to said switching nodes, whereby said switching nodes are able make appropriate connections based on the combination of intelligent network services associated with said at least two SPs.

12. A service brokering method in accordance with claim 11 wherein said receiving, managing, combining and returning steps are performed at a service combination manager service control point (SCM_SCP) that communicates with said switching nodes.

13. A service brokering method in accordance with claim 12 wherein said SPs are resident at service control points (SCPs) that are separate from said SCM_SCP.

14. A service brokering method in accordance with claim 13 wherein each of said SPs is resident at a separate SCP, each of which is separate from said SCM_SCP.

15. A service brokering method in accordance with claim 13 wherein said switching nodes connect to said SCPs as well as said SCM_SCP and said intelligent telecommunications network is configured to direct connection query messages relative to single-service subscribers to selected ones of said service control SCPs and to direct connection query messages relative to multiple-service subscribers to said SCM_SCP.

16. A service brokering method in accordance with claim 15 wherein said switching nodes include a service switching point (SSP) that generates connection query messages in response to user connection requests and passes said connection query messages to a service transfer point (STP), said STP performing global title translation (GTT) on said connection queries to generate a destination point code (DPC) that determines which of said SCPs should receive said connection query messages, and a subsystem service number (SSN) to determine which service should be rendered at said SCP.

17. A service brokering method in accordance with claim 16 further including the step of generating DPCs and SSNs at said SCM_SCP to communicate with SCPs containing SPs managed by said FCMs, said DPC and SSN generating step being performed without performing GTT.

18. A service brokering method in accordance with claim 11 wherein said managing step includes employing at least one FCM within said SCM to invoke plural SPs serially.

19. A service brokering method in accordance with claim 11 wherein said managing step includes employing at least one FCM within said SCM to invoke plural SPs in parallel.

20. A service brokering method in accordance with claim 11 wherein said managing step includes employing at least one FCM within said SCM to invoke plural SPs in alternating fashion.

21. An intelligent telecommunications network, comprising:

a plurality of service switching points (SSPs), each of which acts as a representative for one or more network users;

a plurality of service transfer points (STPs), each of which acts as a message routing agent for one or more of said SSPs;

a plurality of service control points (SCPs), each of which acts as a call setup resource for one or more of said SSPs;

a plurality of interconnections for exchanging messages between said SSPs, said STPs and said SCPs;

said SCPs each containing at least one service program (SP) for providing user-specific connection control messages that are used by said SSPs to implement an intelligent network service subscribed to by one or more network users;

a service combination manager SCP (SCM_SCP) connected to said STPs;

said SCM_SCP containing at least one service combination manager SP (SCM SP) acting as a gateway for incoming connection query messages generated by said SSPs;

a plurality of feature combination managers (FCMs) within said SCM_SP, each of which manages at least two of said SPs by selectively invoking said SPs and formatting the connection control messages generated thereby into appropriate multi-service connection control messages, there being one FCM for each combination of said SPs; and p1 said SCM_SP being configured to return said multi-service connection control messages to said SSPs, whereby said SSPs are able make appropriate connections based on the combination of intelligent network services associated with said at least two SPs.

* * * * *